United States Patent
Segawa et al.

(10) Patent No.: US 6,723,465 B2
(45) Date of Patent: Apr. 20, 2004

(54) NONAQUEOUS ELECTROLYTE BATTERY AND PRODUCTION METHOD THEREOF

(75) Inventors: Ken Segawa, Miyagi (JP); Akira Toda, Tokyo (JP); Yoshinori Ito, Tokyo (JP); Emi Yamada, Tokyo (JP); Yukio Miyaki, Kanagawa (JP); Takashi Tomita, Miyagi (JP); Sam Huy, Tokyo (JP)

(73) Assignee: Sony Corporation, Tokyo (JP)

(*) Notice: Subject to any disclaimer, the term of this patent is extended or adjusted under 35 U.S.C. 154(b) by 105 days.

(21) Appl. No.: 09/784,746

(22) Filed: Feb. 15, 2001

(65) Prior Publication Data

US 2002/0012836 A1 Jan. 31, 2002

(30) Foreign Application Priority Data

Feb. 15, 2000 (JP) ...................................... P2000-041439

(51) Int. Cl.$^7$ .............................. H01M 2/12; H01M 2/08
(52) U.S. Cl. ............................. 429/56; 429/89; 429/174
(58) Field of Search ............................... 429/56, 82, 89, 429/174

(56) References Cited

U.S. PATENT DOCUMENTS

| | | | | |
|---|---|---|---|---|
| 4,345,611 A | * | 8/1982 | Ikeda et al. ............... | 429/56 X |
| 4,454,208 A | * | 6/1984 | Osmialowski .......... | 429/174 X |
| 5,462,820 A | * | 10/1995 | Tanaka ...................... | 429/174 |
| 5,609,972 A | * | 3/1997 | Kaschmitter et al. ......... | 429/56 |
| 5,795,674 A | * | 8/1998 | Shiota ...................... | 429/56 X |
| 5,876,868 A | * | 3/1999 | Tanida ...................... | 429/56 X |
| 6,025,091 A | * | 2/2000 | Kondo et al. ............... | 429/174 |

* cited by examiner

Primary Examiner—Stephen Kalafut
(74) Attorney, Agent, or Firm—Sonnenschein, Nath & Rosenthal LLP

(57) ABSTRACT

A nonaqueous electrolyte batter includes: an electrode body having at least a positive electrode and a negative electrode; a cylindrical container with its bottom closed, in which the electrode body and a nonaqueous electrolytic solution are contained; and a lid body for closing an opening portion of the container. The lid body has a lid portion which constitutes a peripheral edge portion of the lid body, a projecting portion which constitutes a central portion of the lid body, and a stepped portion which has a vent hole and is positioned between the lid portion and the projecting portion. A metal plate having a through-hole is disposed between the lid body and the electrolyte body. With this configuration, it is possible to prevent the movement of the battery by a motive force generated when a decomposition gas generated in an abnormal state is discharged to the outside of the battery.

35 Claims, 7 Drawing Sheets

NONAQUEOUS ELECTROLYTE BATTERY AND PRODUCTION METHOD THEREOF

RELATED APPLICATION DATA

The present application claims priority to Japanese Application No. P2000-041439 filed Feb. 15, 2000, which application is incorporated herein by reference to the extent permitted by law.

BACKGROUND OF THE INVENTION

The present invention relates to a nonaqueous electrolyte battery including a container sealed with a sealing lid, and a method of producing the nonaqueous electrolyte battery.

In recent years, along with progress of the electronic technology, there has been a tendency toward high performance, miniaturization, and portableness of electronic equipment. Batteries used for the electronic equipment have been correspondingly required to have high energy densities, and to meet such a requirement, studies have been actively made to develop nonaqueous electrolyte batteries. In particular, lithium batteries or lithium ion secondary batteries, having performances higher than those of conventional batteries, for example, a high electromotive force of 3 or 4 V, have been adopted for various types of portable electronic equipment, such as a camcorder, a portable telephone, and a notebook type personal computer.

As an electrolytic solution for a lithium or lithium ion battery, there has been used a solution obtained by dissolving an electrolyte exemplified by a lithium based electrolyte salt such as $LiPF_6$ in a nonaqueous solvent exemplified by a carbonate such as low molecular ethylene carbonate, propylene carbonate, or diethyl carbonate. This is because such an electrolytic solution has a relatively high conductivity and exhibits a stable potential.

In the above-described nonaqueous electrolyte battery, an electrolytic solution contains an organic solvent as described above, and accordingly, when wiring of the battery is short-circuited or the battery is abnormally heated for example, the electrolytic solution may be vaporized and decomposed to generate gas. If the generation rate of such a gas becomes a specific value or more, an inner pressure of an enclosed container may be rapidly raised.

To cope with such an abnormality, there is known a nonaqueous electrolyte battery 100 having a mechanism shown in FIG. 1.

The nonaqueous electrolyte battery 100 includes an electrode body 104 formed by spirally winding a stack of a positive electrode 101, a separator 102, and a negative electrode 103; a container 105 for containing the electrode body 104; an insulating plate 106 disposed on a bottom portion of the container 105, for preventing the electrode body 104 from being brought into electric contact with the container 105; and a sealing lid group 107 fixed by caulking to an opening at the upper end of the container 105 via an insulating gasket 113. The sealing lid group 107 includes a disk-like inner lid body 108 disposed opposite to the electrode body 104; a PTC element 110 disposed on a ring portion of the inner lid body 108 via a valve film 109 formed of a flexible thin film; and a cap-shaped battery lid 111 disposed with its peripheral edge being in contact with the PTC element 110. Each of the inner lid body 108 and the PTC element 110 has at its central portion a though-hole, and the battery lid 111 has at its stepped portion vent holes 111a. One end of a positive electrode lead 112 is connected to the positive electrode 101 of the electrode body 104, and the other end thereof is connected to a back surface of the inner lid body 108 of the sealing lid group 7.

In the nonaqueous electrolyte battery 100 having the above-described configuration, if a current larger than a normal current is applied to the battery 100, for example, by over-charging, the resistance of the PTC element 110 positioned between the inner lid 108 and the battery lid 111 is rapidly increased with temperature rise, to stop the supply of current, thereby preventing an increase in inner pressure in the nonaqueous electrolyte battery 100. Further, if a decomposition gas is generated and thereby the inner pressure in the nonaqueous electrolyte battery 100 reaches a specific pressure, the decomposition gas passes through the though-hole opened in the inner lid body 108, to break or melt the valve film 109 positioned over the inner lid body 108. As a result, the decomposition gas is discharged to the outside of the nonaqueous electrolyte battery 100 through the broken portion of the valve film 109, the through-hole opened in the PTC element 110, and the vent holes 111a opened in the battery lid 111, to thereby reduce the inner pressure in the nonaqueous electrolyte battery 100.

By the way, as shown by arrows I in FIG. 1, part of the decomposition gas discharged from the broken portion of the valve film 109 is directly discharged to the outside of the nonaqueous electrolyte battery 100 through the vent holes 111a of the battery lid 111 without collision with the inner side of the battery lid 111. The part of the decomposition gas, which directly passes through the vent holes 111a, is discharged obliquely with respect to the height direction of the nonaqueous electrolyte battery 100, to thereby give a motive force to the nonaqueous electrolyte battery 100.

FIG. 2 is an enlarged view showing a circle portion H in FIG. 1. Referring to FIG. 2, part of the decomposition gas once collides with the inner side of a projecting portion of the battery lid 111 as shown by an arrow J, and is discharged from the vent holes 111a along the direction substantially perpendicular to the height direction of the nonaqueous electrolyte battery 100 as shown by arrows K. Part of the decomposition gas discharged in such a direction, however, collides with a caulking portion formed by inwardly bending an opening edge of the container 105, and flows in the height direction of the nonaqueous electrolyte battery 100 as shown by arrows L.

As a result, there arises a problem that the nonaqueous electrolyte battery 100 is moved by a motive force generated by the discharge of the decomposition gas, to exert adverse effect on peripheral equipment. Further, the decomposition gas having broken the valve film 109 is discharged from the vent holes 111a at a high speed, whereby the motive force given to the nonaqueous electrolyte battery 100 becomes larger. As a result, there arises a problem that the movement of the nonaqueous electrolyte battery 100 by the discharge of the decomposition gas becomes larger.

SUMMARY OF THE INVENTION

An object of the present invention is to provide a nonaqueous electrolyte battery capable of preventing the movement of the nonaqueous electrolyte battery by a motive force generated by discharge of a decomposition gas generated in an abnormal state, and a method of producing the nonaqueous electrolyte battery.

To achieve the above object, according to a first aspect of the present invention, there is provided a nonaqueous electrolyte battery including: an electrode body having at least a positive electrode and a negative electrode; a cylindrical container with its bottom closed, in which the electrode body and a nonaqueous electrolytic solution are contained; and a lid body for closing an opening portion of the container; wherein the lid body has a lid portion which constitutes a peripheral edge portion of the lid body, a projecting portion which constitutes a central portion of the lid body, and a stepped portion which has a vent hole and is positioned between the lid portion and the projecting portion; and a metal plate having a through-hole is disposed between the lid body and the electrode body.

With this configuration, a decomposition gas generated in the container in an abnormal state passes through the through-hole of the metal plate, and at this time, the discharge path of the decomposition gas is suitably restricted in the radial direction of the container, whereby the decomposition gas collides with the inner side of the lid body. As a result, it is possible to sufficiently damp the discharge speed of the decomposition gas and to control the discharge direction of the decomposition gas along the direction substantially perpendicular to the height direction of the battery.

According to a second aspect of the present invention, there is provided a nonaqueous electrolyte battery including: an electrode body having at least a positive electrode and a negative electrode; a cylindrical container with its bottom closed, in which the electrode body and a nonaqueous electrolytic solution are contained; and a lid body for closing an opening portion of the container; wherein the lid body has a lid portion which constitutes a peripheral edge portion of the lid body, a projecting portion which constitutes a central portion of the lid body, and a stepped portion which has a vent hole and is positioned between the lid portion and the projecting portion; and the projecting portion is formed into an approximately circular shape, and is substantially flattened; and letting a diameter of the substantially flattened portion be A and an outside diameter of the container be C, C and A satisfy a relationship of $0.55 \leq A/C \leq 1$.

With this configuration, a decomposition gas generated in the container in an abnormal state once collides with the inner side of the lid body, with a result that the discharge speed of the decomposition gas is damped, and the discharge direction of the decomposition gas is controlled in the direction substantially perpendicular to the height direction of the battery, whereby the decomposition gas is discharged to the outside of the battery through the vent hole of the lid body.

According to a third aspect of the present invention, there is provided a nonaqueous electrolyte battery including: an electrode body having at least a positive electrode and a negative electrode; a cylindrical container with its bottom closed, in which the electrode body and a nonaqueous electrolytic solution are contained; and a lid body for closing an opening portion of the container; wherein the lid body has a lid portion which constitutes a peripheral edge portion of the lid body, a projecting portion which constitutes a central portion of the lid body, and a stepped portion which has a vent hole and is positioned between the lid portion and the projecting portion; the lid body is held by a caulking portion formed by inwardly bending an outer peripheral edge of an opening portion of the container; a height of an end portion, on the projecting portion side, of the vent hole is intermediate between the top of the caulking portion and the projecting portion; and letting a difference in height between the top of the caulking portion and the end portion, on the projecting portion side, of the vent hole be D, and the total height of the battery including the container and the lid body be E, D and E satisfy a relationship of $0.01 \leq D/E \leq 0.1$.

With this configuration, the flow direction of the decomposition gas discharged from the vent hole of the lid body is not blocked by the caulking portion. As a result, the decomposition gas flows along the direction substantially perpendicular to the height direction of the battery.

According to a fourth aspect of the present invention, there is provided a method of producing a nonaqueous electrolyte battery, including the steps of: putting an electrode body having at least a positive electrode and a negative electrode in a cylindrical container with its bottom closed; pouring a nonaqueous electrolytic solution in the container; disposing a metal plate having a through-hole over the electrode body; and placing a lid body on the metal plate in such a manner that an opening portion of the container is closed with the lid body, the lid body having a lid portion which constitutes a peripheral edge portion of the lid body, a projecting portion which constitutes a central portion of the lid body, and a stepped portion which has a vent hole and is positioned between the lid portion and the projecting portion.

With this configuration, it is possible to easily produce a nonaqueous electrolyte battery capable of controlling the discharge direction of a decomposition gas.

DETAILED DESCRIPTION OF THE PREFERRED EMBODIMENTS

Hereinafter, preferred embodiments of a nonaqueous electrolyte battery of the present invention will be described with reference to the drawings.

[First Embodiment]

Figure 1:
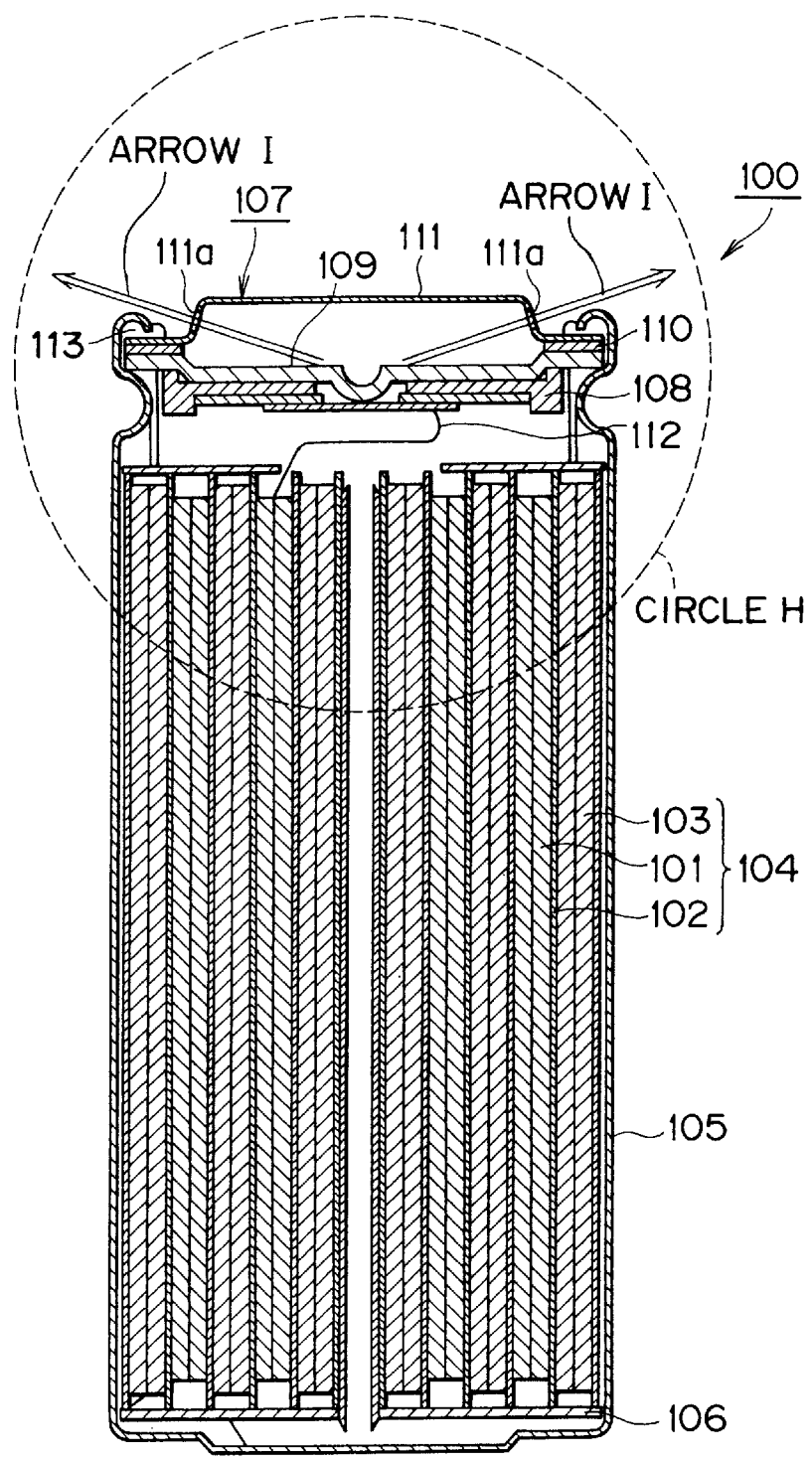
FIG. 1 is a sectional view showing a related art nonaqueous electrolyte battery.
Figure 2:
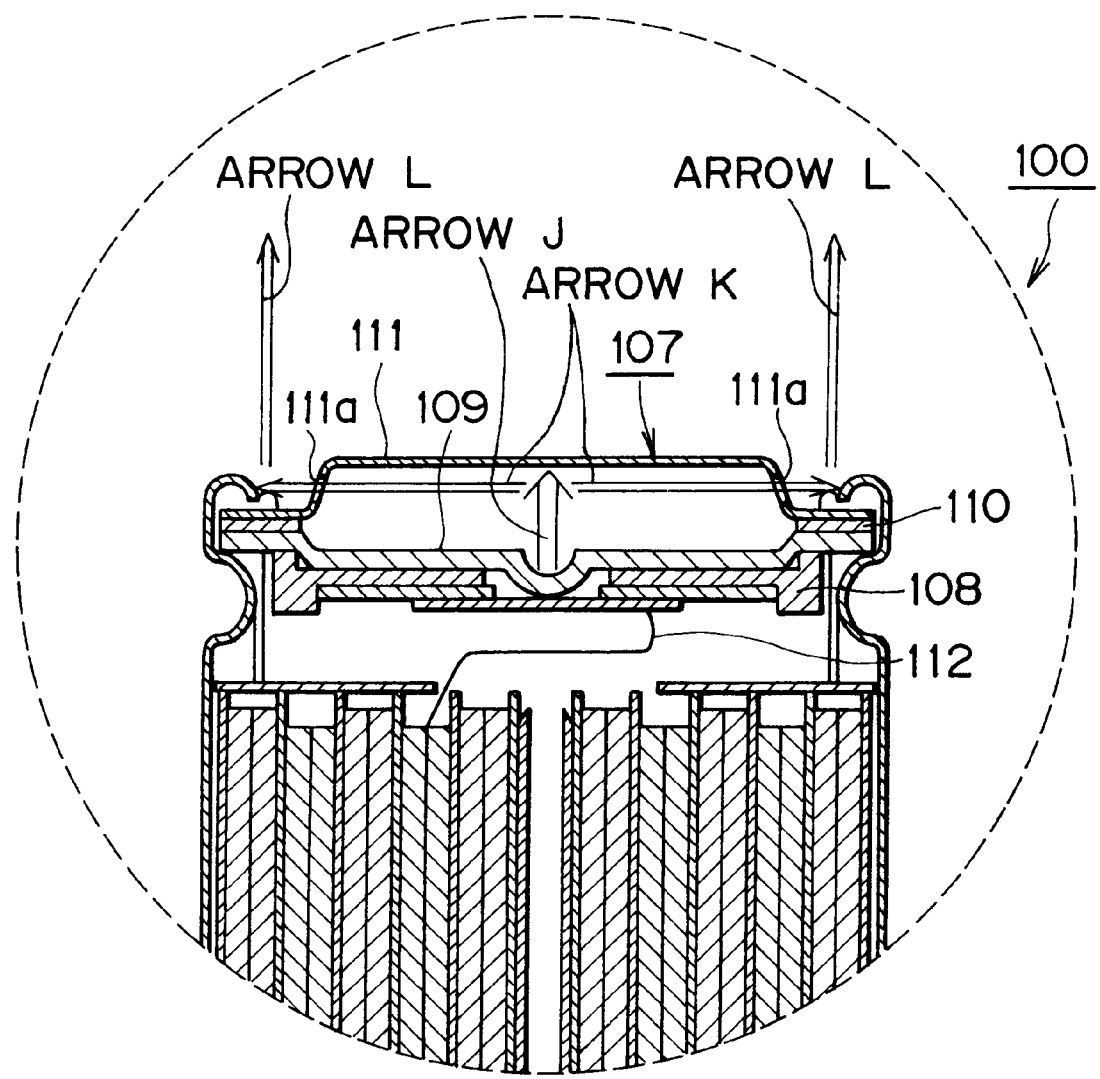
FIG. 2 is an enlarged sectional view of a circle portion shown in FIG. 1.
Figure 3:
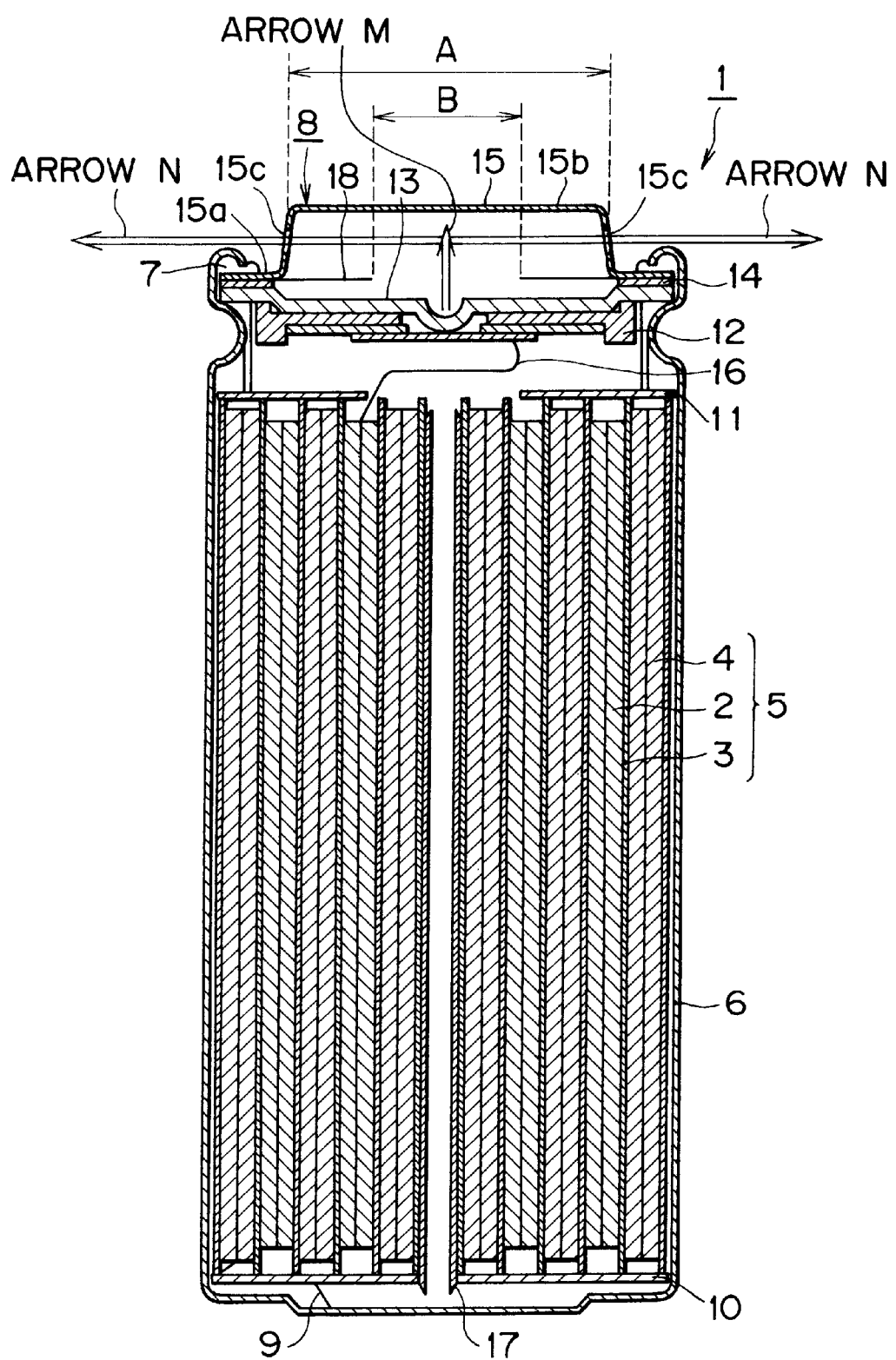
FIG. 3 is a sectional view showing a first embodiment of a nonaqueous electrolyte battery of the present invention.

FIG. 3 shows a first embodiment of a nonaqueous electrolyte battery of the present invention. As shown in this figure, a nonaqueous electrolyte battery 1 includes an electrode body 5 formed by spirally winding a stack of a positive electrode 2, a separator 3, and a negative electrode 4; a container 6 for containing the electrode body 5; a sealing lid group 8 fixed by caulking to an opening portion at an upper end of the container 6 via an insulating gasket 7; and an electrolytic solution enclosed in the container 6. One end of a negative electrode lead 9 is electrically connected to the negative electrode 4, and the other end thereof is electrically connected to the container 6. A bottom insulator 10 having at its central portion a hole is disposed on a bottom portion of the container 6 for preventing the electrode body 5 from being brought into electric contact with the container 6. A top insulator 11 is disposed on an upper portion of the electrode body 5 for preventing the electrode body 5 from being brought into electric contact with the sealing lid group 8.

The sealing lid group 8 includes a disk-like inner lid body 12 disposed opposite to the electrode body; a valve film 13 formed of a flexible thin film disposed on the inner lid body 12; a PTC element 14 disposed on the valve film 13; and an outer lid body 15 disposed with its peripheral edge portion being in contact with the PTC element 14. Each of the inner lid body 12 and the PTC element 14 has at its approximately central portion one or more through-holes. The outer lid body 15 includes a lid portion 15*a* which constitutes a peripheral edge portion of the lid body, a projecting portion 15*b* which constitutes a central portion of the lid body 15, and a stepped portion positioned between the lid portion 15*a* and the projecting portion 15*b*. The stepped portion has a plurality of vent holes 15*c* disposed in an axial symmetric relation with respect to the center of the outer lid body 15. One end of a positive electrode lead 16 is connected to the positive electrode 2 of the electrode body 5 and the other end thereof is connected to a back surface of the inner lid body 12 of the sealing lid group 8.

A center pin 17 made from a metal such as stainless steel or a plastic material can be disposed in a winding core space of the electrode body 5 in order to prevent the collapse of the winding core space and hence to ensure a flow path of a decomposition gas.

In the nonaqueous electrolyte battery 1 according to this embodiment, a metal plate 18 having a though-hole is disposed between the outer lid body 15 and the electrode body 5, and more specifically, positioned typically between the PTC element 14 and the outer lid body 15. The center of the through-hole of the metal plate 18 is set to substantially correspond to the centers of the thin film portion of the valve film 13 and the through-hole of the PTC element 14.

According to the nonaqueous electrolyte battery having the above configuration, when the electrolytic solution is vaporized and decomposed in an abnormal environment to generate a decomposition gas and thereby the inner pressure in the battery 1 is raised to a specific value or more, the decomposition gas having passed the through-hole of the inner lid body 12 first impinges on the inner side of the valve film 13 to break or melt the valve film 13. The decomposition gas having passed through the valve film 13 passes through the though-hole of the PTC element 14 and then passes through the through-hole of the metal plate 18. Finally, the decomposition gas is discharged to the outside of the battery 1 through the vent holes 15*c* formed in the outer lid body 15, whereby the inner pressure in the battery 1 is reduced, to thereby prevent the battery 1 from being damaged due to a rapid increase in inner pressure of the battery 1.

When the decomposition gas passes through the metal plate 18, the flow of the decomposition gas is suitably restricted in the radial direction. Accordingly, the decomposition gas having passed through the through-hole of the metal plate 18 once collides with the inner side of the projecting portion 15*b* of the outer lid body 15 as shown by an arrow M, and is discharged from the vent holes 15*c* provided in the stepped portion of the outer lid body 15 in the direction substantially perpendicular to the height direction of the battery 1 as shown by arrows N. As a result, the discharge speed of the decomposition gas is sufficiently damped, and the discharge direction of the decomposition gas becomes substantially perpendicular to the height direction of the battery 1. Further, since the plurality of vent holes 15*c* are disposed in an axial symmetric manner with respect to the center of the outer lid body 15 as described above, discharge vectors of parts of the decomposition gas discharged symmetrically with respect to the axis of the battery 1 cancel each other out. That is, the motive forces given to the battery 1 are substantially cancel each other out. In this way, the discharge of the decomposition gas can be certainly controlled such that the battery 1 is prevented from being moved by the motive force generated by the discharge of the decomposition gas.

Figure 4:
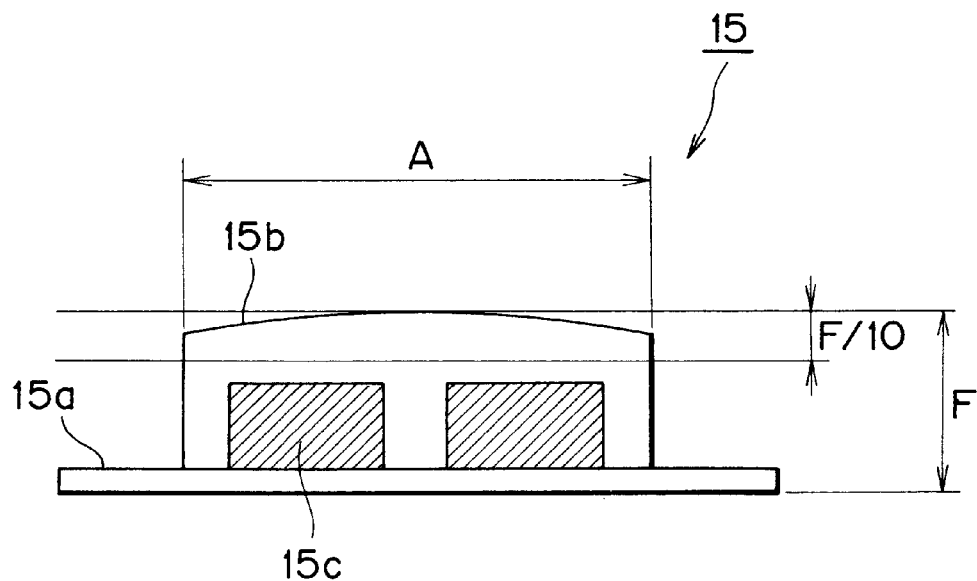
FIG. 4 is a side view illustrating an outer lid body.

According to this embodiment, the through-hole of the metal plate 18 is formed into an approximately circular shape, and the projecting portion 15*b* of the outer lid body 15 is substantially flattened. Letting the diameter of the substantially flattened portion be A and the diameter of the through-hole of the metal plate 18 be B, B and A preferably satisfy a relationship of $0.2 \leq B/A \leq 0.8$. Here, letting the total height of the outer lid body 15 displaced as shown in FIG. 4 be F, the substantially flattened portion of the outer lid body 15 is defined as a portion having a height of less than F/10 from the uppermost end of the outer lid body 15.

When the diameter B of the through-hole of the metal plate 18 and the diameter A of the projecting portion 15*b* of the outer lid body 15 satisfy the above-described relationship of $0.2 \leq B/A \leq 0.8$, it is possible to smoothly discharge the decomposition gas, and to control the discharge direction and the discharge speed of the decomposition gas in such a manner that the battery 1 is prevented from being moved by the motive force generated by the discharge of the decomposition gas. If B/A is less than 0.2, that is, if the through-hole of the metal plate 18 is excessively narrow, the decomposition gas in the container 6 cannot be smoothly discharged to the outside of the battery 1, with a result that there may occur breakage of the battery 1. On the other hand, if B/A is more than 0.8, that is, the through-hole of the metal plate 18 is excessively wider than the projecting portion 15*b* of the outer lid body 15, most of the decomposition gas having passed through the through-hole of the metal plate 18 is directly discharged from the vent holes 15*c* of the outer lid body 15 without collision with the inner side of the projecting portion 15*b* of the outer lid body 15. As a result, the discharge speed of the decomposition gas is not sufficiently damped and thereby a motive force is given to the battery 1, with a result that the battery 1 may be moved by the motive force.

The metal plate 18 is preferably made from a material not melted by the decomposition gas at a high temperature, for example, a metal material such as iron or stainless steel. If the metal plate 18 is made from a material liable to be melted by the decomposition gas, the size of the through-hole of the metal plate 18 is changed by melting, with a result that there may occur an inconvenience that the discharge direction and the discharge speed of the decomposition gas cannot be controlled.

The thickness of the metal plate 18 is preferably set to be in a range of 0.1 mm to 1 mm. When the thickness of the metal plate 18 is in the above range, it is possible to prevent the movement of the battery 1 due to discharge of the decomposition gas while keeping the battery capacity. If the thickness of the metal plate 18 is less than 0.1 mm, the strength of the metal plate 18 may be not enough to control the discharge direction and the discharge speed of the decomposition gas. On the other hand, if the thickness of the metal plate 18 is more than 1 mm, since the volume of the electrode body 5 contained in the container 6 becomes small, the battery capacity may be reduced.

The metal plate 18 can be subjected to rust-preventive treatment. The metal plate 18 may be stuck on the PTC element 14 to be used as one part.

The negative electrode 4 is produced by coating a negative collector with a negative mix containing a negative active material and a binder, and drying the negative mix, to form a negative active material layer on the negative collector. The negative collector is typically formed of a metal foil such as a copper foil.

In production of a lithium primary battery or a lithium secondary battery to which the present invention is applied, the negative electrode 4 is preferably made from lithium, a lithium alloy such as lithium-aluminum alloy, or a material to or from which lithium can be doped or released. As the material to or from which lithium can be doped or released, there can be used a carbon material such as a difficult-to-graphitize carbon based material or a graphite based material. Specific examples of these carbon materials may include pyrolytic carbons, cokes such as pitch coke, needle coke, and petroleum coke, graphites, vitreous carbon fibers, sintered organic high polymer compounds, carbon fibers, and activated charcoals. The sintered organic high polymer compound is produced by sintering phenol resin or furan resin at a suitable temperature, thereby carbonizing the resin.

In addition to the above carbon material, a high polymer such as polyacetylene or polypyrrole, or an oxide such as $SnO_2$ can be used as the material to or from which lithium can be doped or released.

As the binder of the above negative mix, there can be used a known binder, which has been used for a negative mix for a general lithium ion battery. Further, known additives can be added to the negative mix.

The positive electrode 2 is produced by coating a positive collector with a positive mix containing a positive active material and a binder, and drying the positive mix, to form a positive active material layer on the positive collector. The positive collector is typically formed of a metal foil such as an aluminum foil.

As the positive active material, a metal oxide, a metal sulfide, or a specific high polymer can be used depending on the kind of the battery used.

For example, in the case of producing a lithium primary battery, $TiS_2$, $MnO_2$, graphite, or $FeS_2$ can be used as the positive active material. In the case of producing a lithium secondary battery, a metal sulfide such as $TiS_2$, $MOS_2$, or $NbSe_2$, or a metal oxide such as $V_2O_5$ can be used as the positive active material. Further, a transition metal oxide containing lithium, which is typically expressed by a chemical formula $LiM_xO_2$ where M is one or more kinds of transition metals and x is a value depending on a charging/discharging state of the battery and usually set in a range of 0.05 to 1.10, can be also used as the positive active material. The transition metals M of the transition metal oxide containing lithium are represented by Co, Ni, and Mn. Specific examples of the transition metal oxide containing lithium may include $LiCoO_2$, $LiNiO_2$, $LiNi_yCo_{1-y}O_2$ (0<y<1), and $LiMn_2O_4$. Such a transition metal oxide containing lithium is used as the positive active material capable of generating a high voltage and ensuring a high energy density. From the viewpoint of ensuring a large capacity, an oxide of manganese or a composite oxide of lithium and manganese having a spinel type crystal structure is preferably used as the positive active material. The above-described positive active materials may be used for the positive electrode 2 singly or in combination.

As the binder of the above positive mix, there can be used a known binder, which has been used for a positive mix for a general battery. Further, known additives can be added to the positive mix.

The separator 3 is disposed between the positive electrode 2 and the negative electrode 4 for preventing the positive electrode 2 and the negative electrode 4 from being short-circuited by physical contact therebetween. A microporous polyolefine film, such as a polyethylene film or polypropylene film having pores, can be used as the separator 3.

The electrolytic solution is prepared by dissolving an electrolyte salt in a nonaqueous solvent.

As the electrolyte salt, there can be used a known electrolyte salt, which has been generally used as an electrolytic solution for a battery. Specific examples of the electrolyte salts may include lithium salts such as $LiPF_6$, $LiBF_4$, $LiAsF_6$, $LiClO_4$, $LiCF_3SO_3$, $LiN(SO_2CF_3)_2$, $LiC(SO_2CF_3)_3$, $LiAlCl_4$, and $LiSiF_6$. In particular, $LipF_6$ and $LiBF_4$ are desirable from the viewpoint of stability against oxidation.

The electrolyte salt is dissolved in a nonaqueous solvent at a concentration of, preferably, 0.1 mol/L to 3.0 mol/L, more preferably, 0.5 mol/L to 2.0 mol/L.

As the nonaqueous solvent, there can be used a known nonaqueous solvent, which has been used for a general nonaqueous electrolytic solution. Specific examples of the nonaqueous solvents may include a cyclic carbonate such as propylene carbonate or ethylene carbonate, a chain carbonate such as diethyl carbonate or dimethyl carbonate, a carboxylate such as methyl propionate or methyl butyrate, and an ether such as γ-butyl lactone, sulfolane, 2-methyltetrahydrofuran, or dimethoxyethane. These nonaqueous solvents may be used singly or in combination. In particular, a carbonate is preferably used from the viewpoint of stability against oxidation.

The nonaqueous electrolyte battery 1 having the above configuration includes the metal plate 18 having the through-hole, wherein the metal plate 18 is disposed between the electrode body 5 and the outer lid body 15 having the vent holes 15c. A decomposition gas is generated in an abnormal state caused, for example, when the battery 1 is put in fire, to increase the inner pressure in the battery 1, and the decomposition gas is discharged to the outside of the battery 1. At this time, the decomposition gas passes through the through-hole of the metal plate 18. Accordingly, the discharge path of the decomposition gas is suitably restricted in the radial direction of the container 6 by the through-hole of the metal plate 18, whereby the decomposition gas once collides with the inner side of the projecting portion 15b of the outer lid body 15, and is discharged from the vent holes 15c provided in the stepped portion of the outer lid body 15. As a result, it is possible to sufficiently damp the discharge speed of the decomposition gas, and to control the discharge direction of the decomposition gas along the direction substantially perpendicular to the height direction of the battery 1. In this way, according to the nonaqueous electrolyte battery 1 in this embodiment, the discharge direction of the decomposition gas is controlled in such manner that the motive forces generated by the decomposition gas substantially cancel each other out, and since the decomposition gas is slowly discharged, the battery 1 can be prevented from being moved by the motive forces generated by the discharge of the decomposition gas.

The nonaqueous electrolyte battery 1 according to this embodiment is produced in the following procedure.

A strip-like positive electrode 2 is prepared by forming a positive active material on both principal surfaces of a positive collector, and a strip-like negative electrode 4 is prepared by forming a negative active material layer on both principal surfaces of a negative collector. A positive electrode lead 16 and a negative electrode lead 9 are respectively welded to the positive electrode 2 and the negative electrode 4. Both the positive electrode 2 and the negative electrode 4 are wound around a groove of a cotter pin for winding an electrode body, with a separator 3 put therebetween for preventing the strip-like positive electrode 2 and negative electrode 4 having the leads 16 and 9 from being brought into contact with each other, into a spiral columnar shape having a specific diameter and a specific height. The cotter pin is then drawn from the wound body, to obtain a spiral electrode body 5 having a central hole passing through the electrode body 5 in the vertical direction.

A bottom insulator 10 and the electrode body 5 are inserted in a container 6, and a negative electrode lead 9 is welded to the bottom of the container 6 by resistance welding.

A top insulator 11 is assembled on the electrode body 5 having been inserted in the container 6, and part of an upper portion of the container 6 is restricted, to provide a necking portion having a specific dimension.

A specific amount of an electrolytic solution is poured in the container 6 in which the electrode body 5 has been contained.

An insulating gasket 7 is assembled on the necking portion of the container 6 filled with the electrolytic solution, and a valve film 13 is welded to a portion, to which the valve film 13 is to be fixed, of the positive electrode lead 16.

Finally, a PTC element 14 is disposed on a peripheral edge of the valve film 13; a metal plate 18 is placed on the PTC element 14; an outer lid body 15 is placed on the metal plate 18; and the outer lid body 15 is sealingly fixed to an upper end portion of the container 6 by caulking. In this way, a nonaqueous electrolyte battery 1 is obtained.

According to this embodiment, it is possible to simply produce a nonaqueous electrolyte battery immovable by a motive force generated by blow-out of a decomposition gas while minimizing an increase in the number of parts in the battery. That is to say, it is possible to easily produce a nonaqueous electrolyte battery excellent in reliability at a low cost.

According to the above-described embodiment, description has been made by example of the secondary battery; however, the present invention is not limited thereto but may be applicable to a primary battery. The shape of the battery of the present invention is not particularly limited but may be, for example, a cylindrical shape or a square shape, and the size of the battery of the present invention may be freely set.

[Second Embodiment]

A second embodiment of the nonaqueous electrolyte battery of the present invention will be described below.

Figure 5:
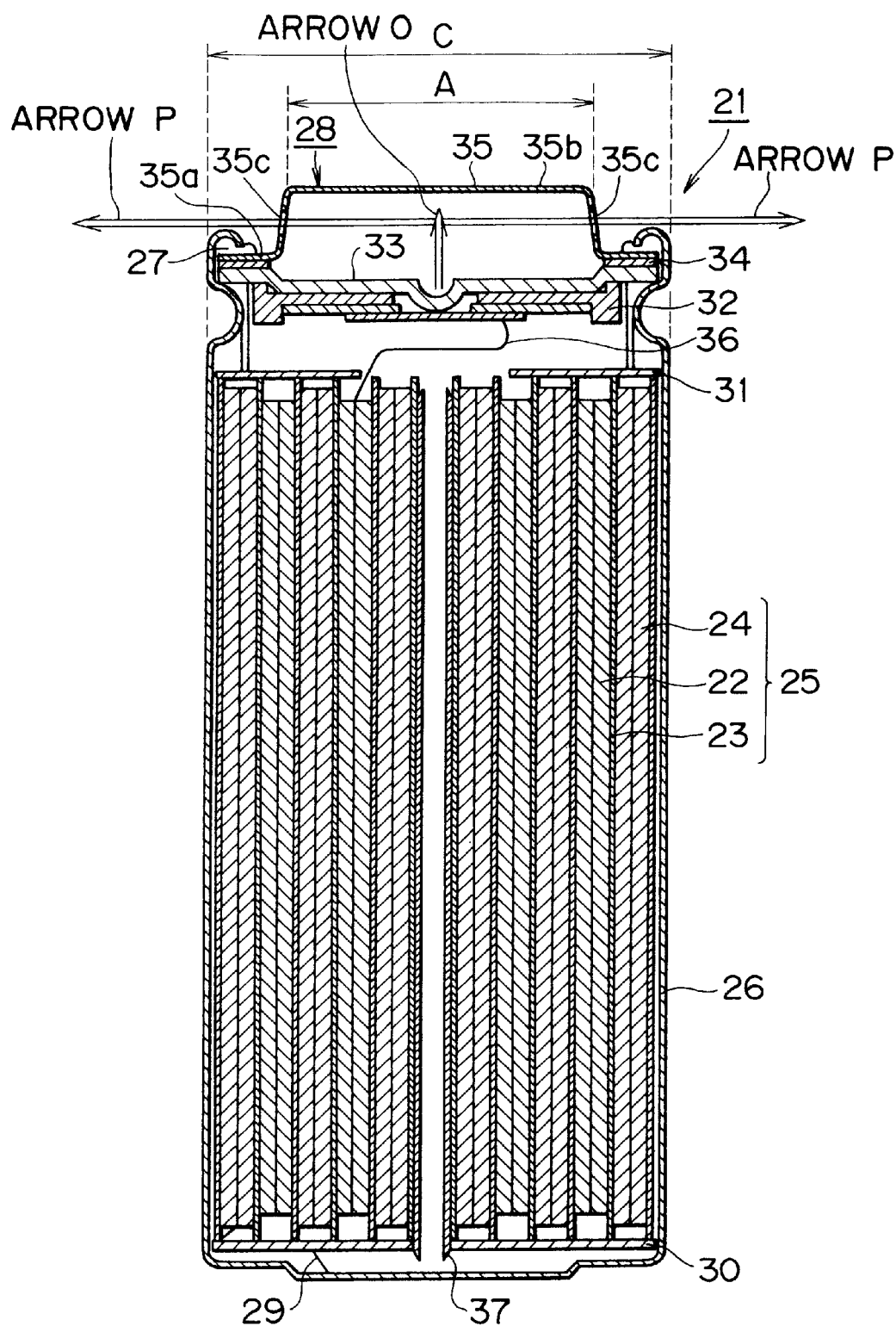
FIG. 5 is a sectional view showing a second embodiment of the nonaqueous electrolyte battery of the present invention.

FIG. 5 shows a second embodiment of the nonaqueous electrolyte battery of the present invention. A nonaqueous electrolyte battery 21 includes an electrode body 25 formed by spirally winding a stack of a positive electrode 22, a separator 23, and a negative electrode 24; a container 26 for containing the electrode body 25; a sealing lid group 28 fixed by caulking to an opening portion at the upper end of the container 26 via an insulating gasket 27; and an electrolytic solution enclosed in the container 26. One end of a negative electrode lead 29 is electrically connected to the negative electrode 24, and the other end thereof is electrically connected to the container 26. A bottom insulator 30 having at its central portion a hole is disposed on a bottom portion of the container 26 for preventing the electrode body 25 from being brought into electric contact with the container 26. A top insulator 31 is disposed on an upper portion of the electrode body 25 for preventing the electrode body 25 from being brought into electric contact with the sealing lid group 28.

The sealing lid group 28 includes a disk-like inner lid body 32 disposed opposite to the electrode body 25; a valve film 33 formed of a flexible thin film disposed on the inner lid body 32; a PTC element 34 disposed on the valve film 33; and a cap-like outer lid body 35 disposed with its peripheral edge portion being in contact with the PTC element 34. Each of the inner lid body 32 and the PTC element 34 has at its approximately central portion one or more through-holes. The outer lid body 35 includes a lid portion 35$a$ which constitutes a peripheral edge portion of the outer lid body 35, a cap-like projecting portion 35$b$ which constitutes a central portion of the outer lid body 35, and a stepped portion positioned between the lid portion 35$a$ and the projecting portion 35$b$. The stepped portion has a plurality of vent holes 35$c$ disposed in an axial symmetric relation with respect to the center of the outer lid body 35. One end of a positive electrode lead 36 is connected to the positive electrode 22 of the electrode body 25 and the other end thereof is connected to a back surface of the inner lid body 32 of the sealing lid group 28.

A center pin 37 made from a metal such as stainless steel or a plastic material can be disposed in a winding core space of the electrode body 25 in order to prevent the collapse of the winding core space and hence to ensure a flow path of a decomposition gas.

In the nonaqueous electrolyte battery 21 according to this embodiment, as shown in FIG. 5, the projecting portion 35$b$ of the outer lid body 35 is substantially flattened. Letting the diameter of the substantially flattened portion be A and the outside diameter of the container 26 be C, C and A satisfy a relationship of $0.55 \leq A/C \leq 1$.

According to the nonaqueous electrolyte battery 21 having the above configuration, when the electrolytic solution is vaporized and decomposed in an abnormal environment to generate a decomposition gas and thereby the inner pressure in the battery 21 is increased to a specific value or more, the decomposition gas having passed through the through-hole of the inner lid body 32 first impinges on the inner side of the valve film 33 to break or melt the valve film 33. The decomposition gas having passed through the valve film 33 passes through the though-hole of the PTC element 34. Finally, the decomposition gas is discharged to the outside of the battery 21 through the vent holes 35$c$ of the outer lid body 35, to thereby prevent the battery 21 from being damaged due to a rapid increase in inner pressure of the battery 21.

In particular, when the diameter A of the projecting portion 35$b$ of the outer lid body 35 and the outside diameter C of the container 26 satisfy the above relationship, that is, the diameter A of the projecting portion 35$b$ of the outer lid body 35 is suitably set to the outside diameter C of the container 26, the decomposition gas once collides with the inner side of the projecting portion 35$b$ of the outer lid body 35 as shown by an arrow O, and is discharged from the vent holes 35$c$ provided in the stepped portion of the outer lid body 35 along the direction substantially perpendicular to the height direction of the battery 21 as shown by arrows P, whereby the discharge speed of the decomposition gas is sufficiently damped and the discharge direction of the decomposition gas becomes substantially perpendicular to the height direction of the battery 21. In this case, since the plurality of vent holes 35$c$ are formed in the axial symmetric manner with respect to the center of the outer lid body 35, the discharge vectors of the components of the decomposition gas discharged symmetrically with respect to the axis of the battery 21 cancel each other out, and therefore, the motive forces given to the battery 1 substantially cancel each other out. As a result, it is possible to certainly control the discharge of the decomposition gas in such a manner that the battery 21 is prevented from being moved by the motive forces generated by the discharge of the decomposition gas. In other words, if A/C is less than 0.55, since the diameter A of the projecting portion 35b of the outer lid body 35 is excessively small to the outside diameter C of the container 26, part of the decomposition gas having passed through the through-holes of the inner lid body 32, the valve film 33, and the PTC element 34 is directly discharged from the vent holes 35c of the outer lid body 35 without collision with the inner side of the projecting portion 35b of the outer lid body 35. Accordingly, the discharge direction of the part of the decomposition gas becomes oblique with respect to the battery 21, with a result that the motive force is given to the battery 21, and since the damping of the discharge speed of the decomposition gas is insufficient, the battery 1 is moved by the discharge of the decomposition gas. On the other hand, if A/C is more than 1, since the diameter A of the projecting portion 35b of the outer lid body 35 is larger than the outside diameter C of the container 26, the capacity of the battery 21 becomes smaller, and the shape of the battery 21 becomes that difficult to be contained in a battery pack.

In addition, the nonaqueous electrolyte battery 21 in which the relationship between the diameter of the projecting portion 35b of the outer lid body 35 and the outside diameter of the container 26 is specified has the same basic configuration as that of the nonaqueous electrolyte battery 1 described in the first embodiment, except that no metal plate having a through-hole is disposed between the electrode body 25 and the outer lid body 35, and therefore, the detailed description of the features of this embodiment, similar to those of the first embodiment, is omitted.

[Third Embodiment]

A third embodiment of the nonaqueous electrolyte battery of the present invention will be described below.

Figure 6:
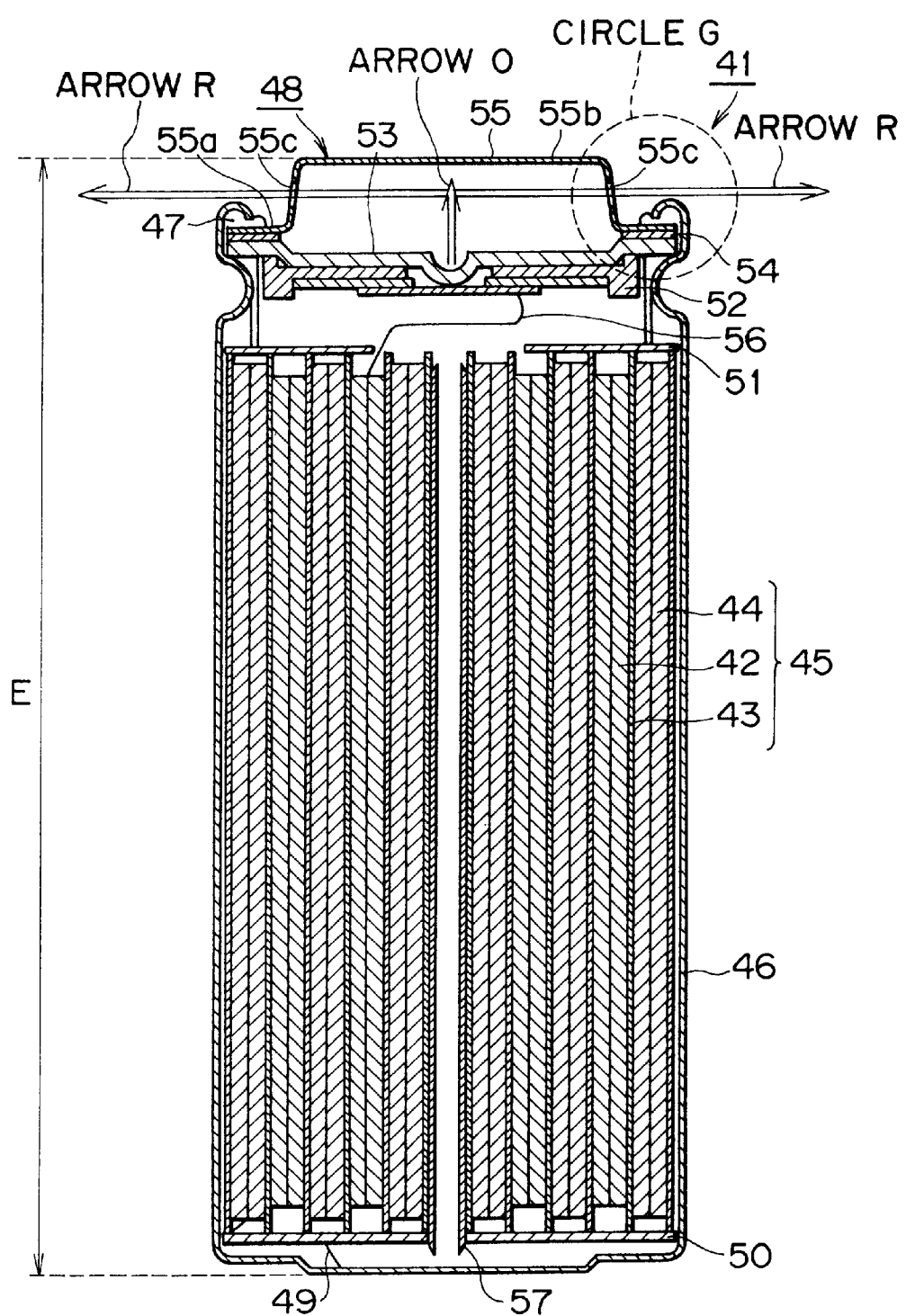
FIG. 6 is a sectional view showing a third embodiment of the nonaqueous electrolyte battery of the present invention.

FIG. 6 shows the third embodiment of the nonaqueous electrolyte battery of the present invention. A nonaqueous electrolyte battery 41 includes an electrode body 45 formed by spirally winding a stack of a positive electrode 42, a separator 43, and a negative electrode 44; a container 46 for containing the electrode body 45; a sealing lid group 48 fixed by caulking to an opening portion at the upper end of the container 46 via an insulating gasket 47; and an electrolytic solution enclosed in the container 46. One end of a negative electrode lead 49 is electrically connected to the negative electrode 44, and the other end thereof is electrically connected to the container 46. A bottom insulator 50 having at its central portion a hole is disposed on a bottom portion of the container 46 for preventing the electrode body 45 from being brought into electric contact with the container 46. A top insulator 51 is disposed on an upper portion of the electrode body 45 for preventing the electrode body 45 from being brought into electric contact with the sealing lid group 48.

The sealing lid group 48 includes a disk-like inner lid body 52 disposed opposite to the electrode body 45; a valve film 53 formed of a flexible thin film disposed on the inner lid body 52; a PTC element 54 disposed on the valve film 53; and a cap-like outer lid body 55 disposed with its peripheral edge portion being in contact with the PTC element 54. Each of the inner lid body 52 and the PTC element 54 has at its approximately central portion one or more through-holes. The outer lid body 55 includes a lid portion 55a which constitutes a peripheral edge portion of the outer lid body 55, a cap-like projecting portion 55b which constitutes a central portion of the outer lid body 55, and a stepped portion positioned between the lid portion 55a and the projecting portion 55b. The stepped portion has a plurality of vent holes 55c disposed in an axial symmetric relation with respect to the center of the outer lid body 55. One end of a positive electrode lead 56 is connected to the positive electrode 42 of the electrode body 55 and the other end thereof is connected to a back surface of the inner lid body 52 of the sealing lid group 48.

A center pin 57 made from a metal such as stainless steel or a plastic material can be disposed in a winding core space of the electrode body 45 in order to prevent the collapse of the winding core space and hence to ensure a flow path of a decomposition gas.

Figure 7:
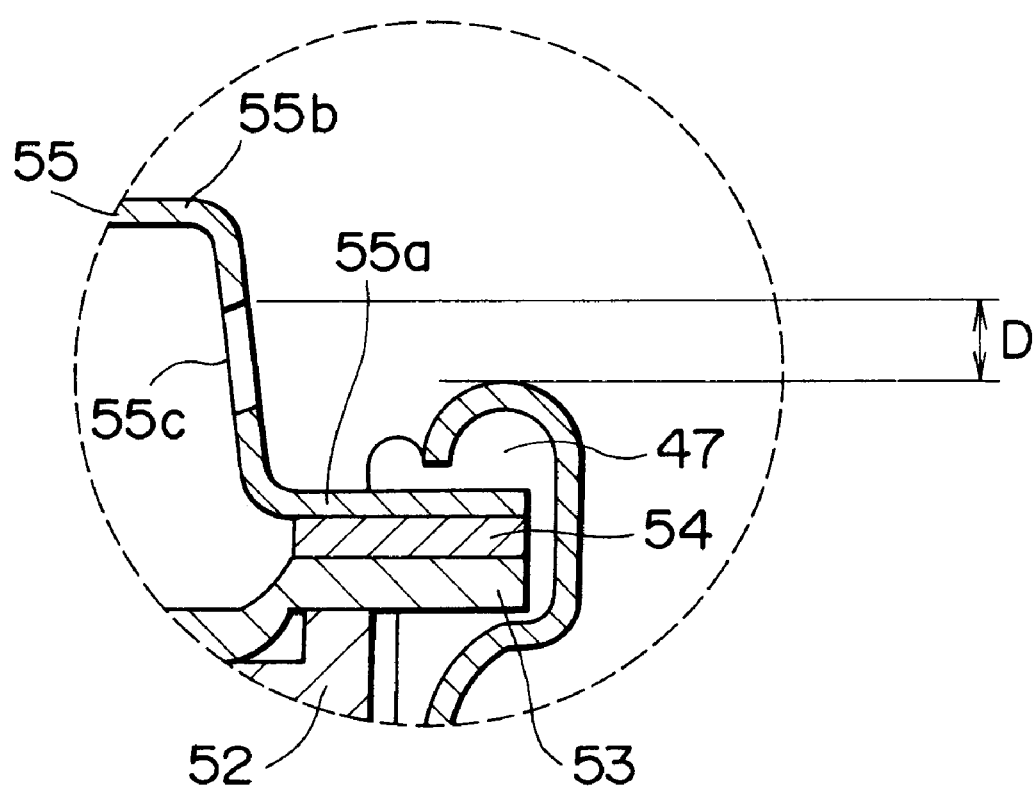
FIG. 7 is an enlarged sectional view of a circle portion shown in FIG. 6.

In the nonaqueous electrolyte battery 41 according to this embodiment, as shown in FIG. 7 which is an enlarged view of a circle portion G of FIG. 6, the height of an end portion, on the projecting portion 55b side, of each of the vent holes 55c of the outer lid body 55 is intermediate between the top of the caulking portion and the top of the projecting portion 55b. Further, letting a difference in height between the top of the caulking portion and the end portion, on the projecting portion 55b side, of the vent hole 55c be D and the total height of the battery 41 including the container 46 and the outer lid body 55 be E, D and E satisfy a relationship of $0.01 \leq D/E \leq 0.1$.

According to the nonaqueous electrolyte battery 41 having the above configuration, when the electrolytic solution is vaporized and decomposed in an abnormal environment to generate a decomposition gas and thereby the inner pressure in the battery 41 is increased to a specific value or more, the decomposition gas having passed through the through-hole of the inner lid body 52 first impinges on the inner side of the valve film 53 to break or melt the valve film 53. The decomposition gas having passed through the valve film 53 passes through the though-hole of the PTC element 54. Finally, the decomposition gas is discharged to the outside of the battery 41 through the vent holes 55c of the outer lid body 55, to thereby prevent the battery 41 from being damaged due to a rapid increase in inner pressure of the battery 41. The decomposition gas once collides with the inner side of the projecting portion 55b of the outer lid body 55 as shown by an arrow Q, and is discharged from the vent holes 55c provided in the stepped portion of the outer lid body 55 along the direction substantially perpendicular to the height direction of the battery 41 as shown by arrows R.

In particular, when D and E satisfy the above relationship, that is, when the height of each vent hole 55c of the outer lid body 55 is sufficient high to the height of the caulking portion of the container 46, the decomposition gas can be smoothly discharged without interference of the discharge path of the decomposition gas with the caulking portion, and the discharge of the decomposition gas can be controlled in such a manner that the battery 41 is not moved by the motive force generated by the discharge of the decomposition gas. In other words, if D/E is less than 0.01, since the height of each vent hole 55c of the outer lid body 55 is insufficient to the height of the caulking portion of the container 46, most of the decomposition gas collides with the caulking portion. As a result, the discharged decomposition gas flows in the height direction of the battery 41, to give a motive force to the battery 41, thereby moving the battery 41. On the other hand, if D/E is more than 0.1, since the outer lid body 55 is excessively high, the energy density per volume of the battery 41 is reduced.

In addition, the nonaqueous electrolyte battery 41 in which the relationship between the height of the caulking portion of the container 46 and the height of each vent hole 55c of the outer lid body 55 is specified has the same basic configuration as that of the nonaqueous electrolyte battery 1 described in the first embodiment, except that no metal plate having a through-hole is disposed between the electrode body 45 and the outer lid body 55, and therefore, the detailed description of the features of this embodiment, similar to those of the first embodiment, is omitted.

The nonaqueous electrolyte battery of the present invention is not limited to that described in each of the first, second, and third embodiments, but may be configured as a combination of the first and second embodiments, a combination of the first and third embodiments, a combination of the second and third embodiments, or a combination of the first, second and third embodiments.

In particular, a nonaqueous electrolyte battery configured as a combination of the first, second and third embodiments is capable of enhancing the effect of sufficiently damping the discharge speed of a decomposition gas and controlling the discharge direction of the decomposition gas, thereby canceling motive forces given to the battery by the discharge of the decomposition gas each other out. As a result, it is possible to certainly prevent the battery from being moved by the discharge of the decomposition gas.

The present invention will be more clearly understood by way of the following examples:

(1) In Examples 1 to 10, to examine the presence or absence of a metal plate, the thickness of the metal plate, and the size of a through-hole of the metal plate, nonaqueous electrolyte batteries were produced as follows:

EXAMPLE 1

A positive mix was prepared by mixing a composite oxide of lithium and cobalt ($LiCoO_2$), a conductive agent, and a binder. The positive mix was dispersed in N-methyl-2-pyrolidone to be slurried. Both surfaces of a strip-like aluminum foil as a positive collector were coated with the slurry of positive mix, followed by drying the slurry of positive mix, to produce a sheet-like positive electrode.

A negative mix was prepared by mixing a carbon material and a binder. The negative mix was dispersed in N-methyl-2-pyrolidone to be slurried. Both surfaces of a copper foil were coated with the slurry of negative mix, followed by drying the slurry of negative mix, to produce a sheet-like negative electrode.

The negative electrode and the positive electrode thus produced were stacked with a separator formed of a porous polypropylene film put therebetween, and were spirally wound to produce an electrode body.

The electrode body was contained in a stainless steel made cylindrical container with its bottom closed, and an electrolytic solution prepared by dissolving $LipF_6$ in a mixed solvent of propylene carbonate and dimethyl carbonate at a mixing volume ratio of 50:50was poured in the container.

The positive electrode of the electrode body contained in the container was connected to an inner lid body having an explosion-proof function and serving as a positive electrode terminal by means of a positive electrode lead. Subsequently, a PTC element, a stainless steel made metal plate having at its central portion a though-hole, and a cap-like outer lid body were air-tightly fixed by caulking to an opening portion of the container via an insulating gasket. In this way, a nonaqueous electrolyte battery having an outside diameter C of 18 mm, a total height E of 65 mm, and a discharge capacity of 6 wh was produced.

In this battery, a thickness of the metal plate was set to 0.5 mm: a diameter B of the through-hole of the metal plate was set to 2.5 mm; a diameter A of a substantially flattened portion of a projecting portion of the outer lid body was set to 12.6 mm; and a difference D in height between each vent hole of the outer lid body and the top of a caulking portion of the container was set to 0.65 mm. Accordingly, the ratio B/A (the ratio of the diameter B of the through-hole of the metal plate to the diameter A of the substantially flattened portion of the outer lid body) was 0.2. The ratio A/C (the ratio of the diameter A of the projecting portion of the outer lid body to the outside diameter C of the container) was 0.7. The ratio D/E (the ratio of the difference D in height between the vent hole of the outer lid body and the top of the caulking portion of the container to the total height E of the battery) was 0.01. In addition, the melting point of the stainless steel is 1500° C. or more.

EXAMPLE 2

A nonaqueous electrolyte battery was produced in the same procedure as that in Example 1, except that the diameter B of the through-hole of the metal plate was set to 10.1 mm. Accordingly, the ratio B/A (the ratio of the diameter B of the through-hole of the metal plate to the diameter A of the projecting portion of the outer lid body) was 0.8.

EXAMPLE 3

A nonaqueous electrolyte battery was produced in the same procedure as that in Example 1, except that the diameter B of the through-hole of the metal plate was set to 1.9 mm. Accordingly, the ratio B/A (the ratio of the diameter B of the through-hole of the metal plate to the diameter A of the projecting portion of the outer lid body) was 0.15.

EXAMPLE 4

A nonaqueous electrolyte battery was produced in the same procedure as that in Example 1, except that the diameter B of the through-hole of the metal plate was set to 11.3 mm. Accordingly, the ratio B/A (the ratio of the diameter B of the through-hole of the metal plate to the diameter A of the projecting portion of the outer lid body) was 0.9.

EXAMPLE 5

A nonaqueous electrolyte battery was produced in the same procedure as that in Example 1, except that the thickness of the metal plate was set to 1 mm and the diameter B of the through-hole of the metal plate was set to 6.3 mm. Accordingly, the ratio B/A (the ratio of the diameter B of the through-hole of the metal plate to the diameter A of the projecting portion of the outer lid body) was 0.5.

EXAMPLE 6

A nonaqueous electrolyte battery was produced in the same procedure as that in Example 5, except that the thickness of the metal plate was set to 0.1 mm.

EXAMPLE 7

A nonaqueous electrolyte battery was produced in the same procedure as that in Example 5, except that the thickness of the metal plate was set to 1.2 mm.

EXAMPLE 8

A nonaqueous electrolyte battery was produced in the same procedure as that in Example 5, except that the thickness of the metal plate was set to 0.05 mm.

EXAMPLE 9

A nonaqueous electrolyte battery was produced in the same procedure as that in Example 4, except that the thickness of the metal plate was set to 1.2 mm.

EXAMPLE 10

A nonaqueous electrolyte battery was produced in the same procedure as that in Example 1, except that the metal plate was not provided.

(2) In Examples 11 to 18, to examine the size of the projecting portion of the outer lid body, nonaqueous electrolyte batteries were produced as follows:

EXAMPLE 11

A nonaqueous electrolyte battery was produced in the same procedure as that in Example 1, except that the diameter B of the through-hole of the metal plate was set to 6.3 mm and the diameter A of the projecting portion of the outer lid body was set to 18 mm. Accordingly, the ratio B/A (the ratio of the diameter B of the through-hole of the metal plate to the diameter A of the projecting portion of the outer lid body) was 0.5, and the ratio A/C (the ratio of the diameter A of the projecting portion of the outer lid body to the outside diameter C of the container) was 1.

EXAMPLE 12

A nonaqueous electrolyte battery was produced in the same procedure as that in Example 1, except that the diameter A of the projecting portion of the outer lid body was set to 9.9 mm. Accordingly, the ratio A/C (the ratio of the diameter A of the projecting portion of the outer lid body to the outside diameter C of the container) was 0.55.

EXAMPLE 13

A nonaqueous electrolyte battery was produced in the same procedure as that in Example 1, except that the diameter A of the projecting portion of the outer lid body was set to 19.8 mm. Accordingly, the ratio A/C (the ratio of the diameter A of the projecting portion of the outer lid body to the outside diameter C of the container) was 1.1.

EXAMPLE 14

A nonaqueous electrolyte battery was produced in the same procedure as that in Example 1, except that the diameter A of the projecting portion of the outer lid body was set to 9 mm. Accordingly, the ratio A/C (the ratio of the diameter A of the projecting portion of the outer lid body to the outside diameter C of the container) was 0.5.

EXAMPLE 15

A nonaqueous electrolyte battery was produced in the same procedure as that in Example 11, except that the metal plate was not provided. Accordingly, the ratio A/C (the ratio of the diameter A of the projecting portion of the outer lid body to the outside diameter C of the container) was 1.

EXAMPLE 16

A nonaqueous electrolyte battery was produced in the same procedure as that in Example 12, except that the metal plate was not provided. Accordingly, the ratio A/C (the ratio of the diameter A of the projecting portion of the outer lid body to the outside diameter C of the container) was 0.55.

EXAMPLE 17

A nonaqueous electrolyte battery was produced in the same procedure as that in Example 13, except that the metal plate was not provided. Accordingly, the ratio A/C (the ratio of the diameter A of the projecting portion of the outer lid body to the outside diameter C of the container) was 1.1.

EXAMPLE 18

A nonaqueous electrolyte battery was produced in the same procedure as that in Example 14, except that the metal plate was not provided. Accordingly, the ratio A/C (the ratio of the diameter A of the projecting portion of the outer lid body to the outside diameter C of the container) was 0.5.

(3) In Examples 19 to 27, to examine the height of each vent hole of the metal plate, nonaqueous electrolyte batteries were produced as follows:

EXAMPLE 19

A nonaqueous electrolyte battery was produced in the same procedure as that in Example 1, except that the diameter B of the through-hole of the metal plate was set to 6.3 mm. Accordingly, the ratio D/E (the ratio of the difference D in height between each vent hole of the outer lid body and the top of the caulking portion of the container to the total height E of the battery) was 0.01.

EXAMPLE 20

A nonaqueous electrolyte battery was produced in the same procedure as that in Example 19, except that the difference D in height between each vent hole of the outer lid body and the top of the caulking portion of the container was set to 6.5 mm. Accordingly, the ratio D/E (the ratio of the difference D in height between each vent hole of the outer lid body and the top of the caulking portion of the container to the total height E of the battery) was 0.1.

EXAMPLE 21

A nonaqueous electrolyte battery was produced in the same procedure as that in Example 19, except that the difference D in height between each vent hole of the outer lid body and the top of the caulking portion of the container was set to 0.325 mm. Accordingly, the ratio D/E (the ratio of the difference D in height between each vent hole of the outer lid body and the top of the caulking portion of the container to the total height E of the battery) was 0.005.

EXAMPLE 22

A nonaqueous electrolyte battery was produced in the same procedure as that in Example 19, except that the difference D in height between each vent hole of the outer lid body and the top of the caulking portion of the container was set to 9.75 mm. Accordingly, the ratio D/E (the ratio of the difference D in height between each vent hole of the outer lid body and the top of the caulking portion of the container to the total height E of the battery) was 0.15.

EXAMPLE 23

A nonaqueous electrolyte battery was produced in the same procedure as that in Example 19, except that the metal plate was not provided. Accordingly, the ratio D/E (the ratio of the difference D in height between each vent hole of the outer lid body and the top of the caulking portion of the container to the total height E of the battery) was 0.01.

EXAMPLE 24

A nonaqueous electrolyte battery was produced in the same procedure as that in Example 20, except that the metal plate was not provided. Accordingly, the ratio D/E (the ratio of the difference D in height between each vent hole of the outer lid body and the top of the caulking portion of the container to the total height E of the battery) was 0.1.

EXAMPLE 25

A nonaqueous electrolyte battery was produced in the same procedure as that in Example 21, except that the metal plate was not provided. Accordingly, the ratio D/E (the ratio of the difference D in height between each vent hole of the outer lid body and the top of the caulking portion of the container to the total height E of the battery) was 0.005.

EXAMPLE 26

A nonaqueous electrolyte battery was produced in the same procedure as that in Example 22, except that the metal plate was not provided. Accordingly, the ratio D/E (the ratio of the difference D in height between each vent hole of the outer lid body and the top of the caulking portion of the container to the total height E of the battery) was 0.15.

EXAMPLE 27

A nonaqueous electrolyte battery was produced in the same procedure as that in Example 1, except that the diameter A of the projecting portion of the outer lid body was set to 9 mm; the difference D in height between each vent hole of the outer lid body and the top of the caulking portion of the container was set to 0.325 mm; and the metal plate was not provided. Accordingly, the ratio A/C (the ratio of the diameter A of the projecting portion of the outer lid body to the outside diameter C of the container) was 0.5. The ratio D/E (the ratio of the difference D in height between each vent hole of the outer lid body and the top of the caulking portion of the container to the total height E of the battery) was 0.005.

(4) In Examples 28 and 29, to examine the material of the metal plate, nonaqueous electrolyte batteries were produced as follows:

EXAMPLE 28

A nonaqueous electrolyte battery was produced in the same procedure as that in Example 1, except that the metal plate was made from aluminum. In addition, the melting point of aluminum is 660° C.

EXAMPLE 29

A nonaqueous electrolyte battery was produced in the same procedure as that in Example 2, except that the metal plate was made from silver. In addition, the melting point of silver is 961° C.

Each of the nonaqueous electrolyte batteries thus produced in Examples 1 to 29 was tested in terms of a performance capable of preventing movement of the battery due to discharge of a decomposition gas generated in an abnormal environment caused typically when the battery was put in fire. Concretely, the test was performed by placing ten pieces of the nonaqueous electrolyte batteries produced in each of Examples 1 to 29 over burning charcoal in a portable kitchen stove, to generate a decomposition gas in each battery.

The criterion of evaluation for each battery is as follows:
⊚⊚⊚: no movement of battery
⊚⊚: average movement distance to be less than 10 cm
⊚: average movement distance to be equal to or more than 10 cm and less than 20 cm
○: average movement distance to be equal to or more than 20 cm and less than 40 cm
Δ: average movement distance to be equal to or more than 40 cm and less than 60 cm
x: average movement distance to be equal to or more than 60 cm The evaluated results are shown in Table 1

TABLE 1

| | Thickness (mm) | B/A | A/C | D/E | Movement distance | comments |
|---|---|---|---|---|---|---|
| Example 1 | 0.5 | 0.2 | 0.7 | 0.01 | ⊚⊚⊚ | |
| Example 2 | 0.5 | 0.8 | 0.7 | 0.01 | ⊚⊚⊚ | |
| Example 3 | 0.5 | 0.15 | 0.7 | 0.01 | ⊚⊚⊚ | breakage of battery: two pieces |
| Example 4 | 0.5 | 0.9 | 0.7 | 0.01 | ⊚⊚ | |
| Example 5 | 1 | 0.5 | 0.7 | 0.01 | ⊚⊚⊚ | |
| Example 6 | 0.1 | 0.5 | 0.7 | 0.01 | ⊚⊚⊚ | |
| Example 7 | 1.2 | 0.5 | 0.7 | 0.01 | ⊚⊚⊚ | reduction in capacity |
| Example 8 | 0.05 | 0.5 | 0.7 | 0.01 | ⊚⊚ | |
| Example 9 | 1.2 | 0.9 | 0.7 | 0.01 | ⊚ | |
| Example 10 | — | — | 0.7 | 0.01 | ○ | |
| Example 11 | 0.5 | 0.5 | 1 | 0.01 | ⊚⊚⊚ | |
| Example 12 | 0.5 | 0.5 | 0.55 | 0.01 | ⊚⊚⊚ | |
| Example 13 | 0.5 | 0.5 | 1.1 | 0.01 | ⊚⊚⊚ | difficult to be practically used |
| Example 14 | 0.5 | 0.5 | 0.5 | 0.01 | ⊚⊚ | |
| Example 15 | — | — | 1 | 0.01 | ○ | |
| Example 16 | — | — | 0.55 | 0.01 | ○ | |
| Example 17 | — | — | 1.1 | 0.01 | ○ | difficult to be practically used |
| Example 18 | — | — | 0.5 | 0.01 | Δ | |
| Example 19 | 0.5 | 0.5 | 0.7 | 0.01 | ⊚⊚⊚ | |
| Example 20 | 0.5 | 0.5 | 0.7 | 0.1 | ⊚⊚⊚ | |
| Example 21 | 0.5 | 0.5 | 0.7 | 0.005 | ⊚⊚ | |
| Example 22 | 0.5 | 0.5 | 0.7 | 0.15 | ⊚⊚⊚ | reduction in capacity |
| Example 23 | — | — | 0.7 | 0.01 | ○ | |
| Example 24 | — | — | 0.7 | 0.1 | ○ | |
| Example 25 | — | — | 0.7 | 0.005 | Δ | |
| Example 26 | — | — | 0.7 | 0.15 | ○ | reduction in capacity |
| Example 27 | — | — | 0.5 | 0.005 | X | |
| Example 28 | 0.5 | 0.2 | 0.7 | 0.01 | ○ | metal plate made from aluminum (low m. p.) |
| Example 29 | 0.5 | 0.8 | 0.7 | 0.01 | ⊚⊚⊚ | metal plate made from silver (expensive) |

The size of the through-hole of the metal plate was examined as follows. As is apparent from the results shown in Table 1, in comparison with the battery having no metal plate in Example 10, each of the batteries having the metal plates in Examples 1 to 9 was effective to control the discharge of the decomposition gas and hence to suppress the movement of the battery.

In particular, the battery in each of Examples 1 and 2 was not moved at all, and therefore, exhibited a very desirable effect. On the contrary, the battery in Example 3, in which the ratio B/A (the ratio of the diameter B of the through-hole of the metal plate to the diameter A of the projecting portion of the outer lid body) was set to be less than 0.2, was undesirable in that the caulking portion of the container was removed by the inner pressure and thereby the electrode body was protruded outwardly. The reason for this is that since the through-hole is excessively narrow, the discharge of the decomposition gas becomes insufficient, thereby failing to readily reduce the inner pressure in the battery. The battery in each of Examples 4 and 9, in which the ratio B/A was set to be more than 0.8, that is, the size of the through-hole of the metal plate was excessively large, was undesirable in that part of the decomposition gas was directly discharged to the outside of the battery through the vent holes formed in the outer lid body, thereby failing to perfectly suppress the movement of the battery. Accordingly, it was found that the movement of the battery can be prevented by setting the diameter B of the through-hole of the metal plate and the diameter A of the projecting portion of the outer lid body to satisfy the relationship of $0.2 \leq B/A \leq 0.8$.

The thickness of the metal plate was examined as follows. The battery in each of Examples 5 and 6 was not moved at all, and therefore, exhibited a very desirable effect. On the contrary, the battery in each of Examples 7 and 8, in which the thickness of the metal plate was more than 1 mm, was prevented from being moved but was reduced in its capacity. The battery in Example 8, in which the thickness of the metal plate was less than 0.1 mm, that is, the strength of the metal plate was insufficient to control the discharge direction and the discharge speed of the decomposition gas, could not be perfectly prevented from being moved. Accordingly, it was found that the discharge of the decomposition gas can be controlled without reducing the capacity of the battery by setting the thickness of the metal plate to be in the range of 0.1 mm to 1 mm.

The diameter of the projecting portion of the outer lid body was examined as follows. The battery in each of Examples 11 and 12 was not moved at all, and therefore, exhibited a very desirable effect. On the contrary, the battery in Example 13, in which the ratio A/C (the ratio of the diameter A of the projecting portion of the outer lid body to the outside diameter C of the container) was more than 1, that is, the size of the projecting portion of the outer lid body was more than the outside diameter of the battery, was difficult to be practically used. The battery in Example 14, in which the ratio A/C was less than 0.55, was undesirable in that the discharge direction and the discharge speed of the decomposition gas could not be controlled, thereby failing to perfectly suppress the movement of the battery. Accordingly, it was found that the movement of the battery can be prevented by setting the ratio A/C to satisfy the relationship of $0.55 \leq A/C \leq 1$. Further, from the comparison with the battery in each of Examples 15 to 18, the effect of preventing the movement of the battery can be further improved by setting the ratio A/C to satisfy the relationship of $0.55 \leq A/C \leq 1$ and providing the metal plate.

The height of each vent hole was examined as follows. The battery in each of Examples 19 and 20 was not moved at all, and therefore, exhibited a very desirable effect. On the contrary, the battery in Example 21, in which the ratio D/E (the ratio of the difference D in height between each vent hole of the outer lid body and the top of the caulking portion of the container to the total height E of the battery) was set to be less than 0.01, was undesirable in that the discharge direction of the decomposition gas could not be controlled, thereby failing to perfectly control the movement of the battery. The battery in Example 22, in which the ratio D/E was more than 0.1, that is, the outer lid body was excessively high, was prevented from being moved, but was undesirable in that both the energy density per volume and the energy density per weight were reduced. Accordingly, it was found that the movement of the battery can be prevented by setting the ratio D/E to satisfy the relationship of $0.01 \leq D/E \leq 0.1$.

From the comparison with the battery in each of Examples 23 to 26, the effect of preventing the movement of the battery can be further improved by setting the ratio D/E to satisfy the relationship of $0.01 \leq D/E \leq 0.1$ and providing the metal plate.

The material of the metal plate was examined as follows. The battery in Example 28, in which the metal plate was made from aluminum having a low melting point, was undesirable in that the metal plate was melted by the decomposition gas at a high temperature and thereby the through-hole of the metal plate was deformed, with a result that the control of the discharge direction and the discharge speed of the decomposition gas was insufficient, thereby failing to perfectly prevent the movement of the battery. The battery in Example 29, in which the metal plate was made from silver, was prevented from being moved, but was expensive. Accordingly, it was found that stainless steel used as the material of the metal plate is not melted by the decomposition gas, to effectively prevent the movement of the battery at a low cost.

As is apparent from the test results of the batteries in Examples 1, 2, 5, 6, 11, 12, 19, and 20, by satisfying the requirements of the thickness of the metal plate, the ratio B/A (the ratio of the diameter B of the through-hole of the metal plate to the diameter A of the projecting portion of the outer lid body), the ratio A/C (the ratio of the diameter A of the projecting portion of the outer lid body to the outside diameter C of the container), and the ratio D/E (the ratio of the difference D in height between the vent hole of the outer lid body and the top of the caulking portion of the container to the total height E of the battery), it is possible to perfectly control the discharge direction and the discharge speed of the decomposition gas and thereby certainly prevent the movement of the battery even in an abnormal environment caused typically when the battery is put in fire.

While the preferred embodiments of the present invention have been described using specific terms, such description is for illustrative purposes only, and it is to be understood that changes and variations may be made without departing from the spirit or scope of the following claims.

What is claimed is:

1. A nonaqueous electrolyte battery comprising:
    an electrode body having at least a positive electrode and a negative electrode;
    a cylindrical container with its bottom closed, in which said electrode body and a nonaqueous electrolytic solution are contained; and
    a sealing lid group, the sealing group comprising a lid body for closing an opening portion of said container and a disk-shaped inner lid body which is disposed opposite the electrode body;
    wherein said lid body has a lid portion which constitutes a peripheral edge portion of said lid body, a projecting portion which constitutes a central portion of said lid body, and a stepped portion which has a vent hole and is positioned between said lid portion and said projecting portion; and
    a metal plate which laterally extends into said lid body, said metal plate having a through-hole at a central portion of said metal plate to restrict a flow of decomposition gas, said metal plate being disposed between said lid body and said inner lid body.

2. A nonaqueous electrolyte battery according to claim 1, wherein said through-hole of said metal plate is a substantially elliptical shape.

3. A nonaqueous electrolyte battery comprising:
    an electrode body having at least a positive electrode and a negative electrode;
    a cylindrical container with its bottom closed, in which said electrode body and a nonaqueous electrolytic solution are contained; and
    a sealing lid group, the sealing lid group comprising a lid body for closing an opening portion of said container and a disk-shaped inner lid body which is disposed opposite the electrode body;

wherein said lid body has a lid portion which constitutes a peripheral edge portion of said lid body, a projecting portion which constitutes a central portion of said lid body, and a stepped portion which has a vent hole and is positioned between said lid portion and said projecting portion; and a metal plate having a through-hole is disposed between said lid body and said inner lid body;

wherein said through-hole of said metal plate is a substantially elliptical shape; and wherein said projecting portion is formed into a substantially circular shape; and is substantially planar; and letting a diameter of said substantially planar portion be A and a diameter of said through-hole of said metal plate be B, wherein B and A satisfy a relationship of $0.2 \leq B/A \leq 0.8$.

4. A nonaqueous electrolyte battery according to claim 1, wherein said metal plate is comprised of iron.

5. A nonaqueous electrolyte battery according to claim 1, wherein a thickness of said metal plate is in a range of 0.1 mm to 1 mm.

6. A nonaqueous electrolyte battery comprising:

an electrode body having at least a positive electrode and a negative electrode;

a cylindrical container with its bottom closed, in which said electrode body and a nonaqueous electrolytic solution are contained; and a sealing lid group, the sealing lid group comprising a lid body for closing an opening portion of said container and a disk-shaped inner lid body which is disposed opposite the electrode body;

wherein said lid body has a lid portion which constitutes a peripheral edge portion of said lid body, a projecting portion which constitutes a central portion of said lid body, and a stepped portion which has a vent hole and is positioned between said lid portion and said projecting portion; and a metal plate having a through-hole is disposed between said lid body and said inner lid body;

wherein said projecting portion is formed into a substantially circular shape, and is substantially planar; and letting a diameter of said substantially planar portion be A and and an outside diameter of said container be C, wherein C and A satisfy a relationship of $0.55 \leq A/C \leq 1$.

7. A nonaqueous electrolyte battery comprising:

an electrode body having at least a positive electrode and a negative electrode;

a cylindrical container with its bottom closed, in which said electrode body and a nonaqueous electrolytic solution are contained; and a sealing lid group, the sealing lid group comprising a lid body for closing an opening portion of said container and a disk-shaped inner lid body which is disposed opposite the electrode body;

wherein said lid body has a lid portion which constitutes a peripheral edge portion of said lid body, a projecting portion which constitutes a central portion of said lid body, and a stepped portion which has a vent hole and is positioned between said lid portion and said projecting portion; and a metal plate having a through-hole is disposed between said lid body and said inner lid body;

wherein said lid body is held by a caulking portion formed by inwardly bending an outer peripheral edge of an opening portion of said container;

a height of an end portion, on the projecting portion side, of said vent hole is intermediate between the top of said caulking portion and said projecting portion; and letting a difference in height between the top of said caulking portion and the end portion, on the projecting portion side, of said vent hole be D, and the total height of said battery including said container and said lid body be E, wherein D and E satisfy a relationship of $0.01 \leq D/E \leq 0.1$.

8. A nonaqueous electrolyte battery according to claim 1, wherein each of said negative electrode and said positive electrode is made from a material one of to and from which lithium can be one of doped and released.

9. A nonaqueous electrolyte battery according to claim 1, wherein said negative electrode contains a carbon material.

10. A nonaqueous electrolyte battery according to claim 1, wherein said positive electrode contains a transition metal oxide containing lithium.

11. A nonaqueous electrolyte battery comprising:

an electrode body having at least a positive electrode and a negative electrode;

a cylindrical container with its bottom closed, in which said electrode body and a nonaqueous electrolytic solution are contained; and a lid body for closing an opening portion of said container;

wherein said lid body has a lid portion which constitutes a peripheral edge portion of said lid body, a projecting portion which constitutes a central portion of said lid body, and a stepped portion which has a vent hole and is positioned between said lid portion and said projecting portion; and said projecting portion is formed into an substantially circular shape, and is substantially planar; and letting a diameter of said substantially planar portion be A and an outside diameter of said container be C, wherein C and A satisfy a relationship of $0.55 \leq A/C \leq 1$.

12. A nonaqueous electrolyte battery according to claim 11, wherein a metal plate having a through-hole is disposed between said electrode body and said lid body.

13. A nonaqueous electrolyte battery according to claim 12, wherein said through-hole of said metal plate is formed into a substantially elliptic shape.

14. A nonaqueous electrolyte battery according to claim 13, wherein said projecting portion is formed into a substantially circular shape, and is substantially flattened; and letting a diameter of said substantially flattened portion be A and a diameter of said through-hole of said metal plate be B, B and A satisfy a relationship of $0.2 \leq B/A \leq 0.8$.

15. A nonaqueous electrolyte battery according to claim 12, wherein said metal plate is comprised of iron.

16. A nonaqueous electrolyte battery according to claim 12, wherein a thickness of said metal plate is in a range of 0.1 mm to 1 mm.

17. A nonaqueous electrolyte battery according to claim 11, wherein said lid body is held by a caulking portion formed by inwardly bending an outer peripheral edge of an opening portion of said container;

a height of an end portion, on the projecting portion side, of said vent hole is intermediate between the top of said caulking portion and said projecting portion; and letting a difference in height between the top of said caulking portion and the end portion, on the projecting portion side, of said vent hole be D, and the total height of said battery including said container and said lid body be E, wherein D and E satisfy a relationship of $0.01 \leq D/E \leq 0.1$.

18. A nonaqueous electrolyte battery according to claim 11, wherein each of said negative electrode and said positive electrode is made from a material one of to and from which lithium can be doped and released.

19. A nonaqueous electrolyte battery according to claim 11, wherein said negative electrode contains a carbon material.

20. A nonaqueous electrolyte battery according to claim 11, wherein said positive electrode contains a transition metal oxide containing lithium.

21. A nonaqueous electrolyte battery comprising:

an electrode body having at least a positive electrode and a negative electrode;

a cylindrical container with its bottom closed, in which said electrode body and a nonaqueous electrolytic solution are contained; and a lid body for closing an opening portion of said container;

wherein said lid body has a lid portion which constitutes a peripheral edge portion of said lid body, a projecting portion which constitutes a central portion of said lid body, and a stepped portion which has a vent hole and is positioned between said lid portion and said projecting portion;

said lid body is held by a caulking portion formed by inwardly bending an outer peripheral edge of an opening portion of said container;

a height of an end portion, on the projecting portion side, of said vent hole is intermediate between the top of said caulking portion and said projecting portion; and letting a difference in height between the top of said caulking portion and the end portion, on the projecting portion side, of said vent hole be D, and the total height of said battery including said container and said lid body be E, wherein D and E satisfy a relationship of $0.01 \leq D/E \leq 0.1$.

22. A nonaqueous electrolyte battery according to claim 21, wherein a metal plate having a through-hole is disposed between said electrode body and said lid body.

23. A nonaqueous electrolyte battery according to claim 22, wherein said through-hole of said metal plate is formed into an substantially elliptic shape.

24. A nonaqueous electrolyte battery according to claim 21, wherein said projecting portion is formed into a substantially circular shape, and is substantially planar; and letting a diameter of said substantially planar portion be A and a diameter of said through-hole of said metal plate be B, wherein B and A satisfy a relationship of $0.2 \leq B/A \leq 0.8$.

25. A nonaqueous electrolyte battery according to claim 22, wherein said metal plate is comprised of iron.

26. A nonaqueous electrolyte battery according to claim 22, wherein a thickness of said metal plate is in a range of 0.1 mm to 1 mm.

27. A nonaqueous electrolyte battery according to claim 21, wherein said projecting portion is formed into a substantially circular shape, and is substantially planar; and letting a diameter of said substantially planar portion be A and an outside diameter of said container be C, wherein C and A satisfy a relationship of $0.55 \leq A/C \leq 1$.

28. A nonaqueous electrolyte battery according to claim 21, wherein each of said negative electrode and said positive electrode is made from a material one of to and from which lithium can be doped and released.

29. A nonaqueous electrolyte battery according to claim 21, wherein said negative electrode contains a carbon material.

30. A nonaqueous electrolyte battery according to claim 21, wherein said positive electrode contains a transition metal oxide containing lithium.

31. A method of producing a nonaqueous electrolyte battery, comprising the steps of:

putting an electrode body having at least a positive electrode and a negative electrode in a cylindrical container with its bottom closed;

pouring a nonaqueous electrolytic solution in said container;

disposing a metal plate over said electrode body, said metal plate having a through-hole at a central portion thereof to restrict a flow of decomposition gas; and placing a lid body on said metal plate in such a manner that said metal plate extends laterally into said lid body and an opening portion of said container is closed with said lid body, said lid body having a lid portion which constitutes a peripheral edge portion of said lid body, a projecting portion which constitutes a central portion of said lid body, and a stepped portion which has a vent hole and is positioned between said lid portion and said projecting portion.

32. The nonaqueous electrolyte battery according to claim 1 where said metal plate is planar.

33. A nonaqueous electrolyte battery according to claim 1 wherein said metal plate is comprise of stainless steel.

34. A nonaqueous electrolyte battery according to claim 12 wherein said metal plate is composed of stainless steel.

35. A nonaqueous electrolyte battery according to claim 22 wherein said metal plate is comprised of stainless steel.

* * * * *